United States Patent [19]

Kawaguchi et al.

[11] Patent Number: 4,767,306

[45] Date of Patent: Aug. 30, 1988

[54] INJECTION APPARATUS

[75] Inventors: Toshiro Kawaguchi, Yamaguchi; Takefumi Sonoda; Kiyoshi Hashimoto, both of Ube, all of Japan

[73] Assignee: UBE Industries, Ltd., Yamaguchi, Japan

[21] Appl. No.: 852,573

[22] Filed: Apr. 16, 1986

[30] Foreign Application Priority Data

Apr. 16, 1985 [JP] Japan .................................. 60-79197
Jul. 31, 1985 [JP] Japan ................................. 60-168898

[51] Int. Cl.[4] ........................................... B29C 45/23
[52] U.S. Cl. ................................. 425/382.4; 425/564; 425/586; 425/587
[58] Field of Search ........... 425/376 R, 376 A, 376 B, 425/381, 564, 585–587, DIG. 225, DIG. 227, 562, 567, 568, DIG. 228; 264/40.5, 328.1

[56] References Cited

U.S. PATENT DOCUMENTS

| 1,367,196 | 2/1921 | Lucas | 425/587 X |
| 2,382,655 | 8/1945 | Nichols | 425/587 X |
| 3,118,184 | 1/1964 | Swenson | 425/587 X |
| 3,263,276 | 8/1966 | Maier | 425/587 X |
| 3,398,435 | 8/1968 | Novel | 425/587 X |
| 3,456,298 | 7/1969 | Foster et al. | 264/40.5 X |
| 3,509,601 | 5/1970 | Johansson | 425/564 X |
| 3,698,845 | 10/1972 | Paulson | 425/585 X |
| 3,706,827 | 12/1972 | Nott et al. | 425/585 X |
| 3,888,393 | 6/1975 | Drori | 425/587 X |
| 4,358,033 | 11/1982 | Dykehouse | 425/564 X |
| 4,422,842 | 12/1983 | Monnet | 425/586 X |
| 4,477,242 | 10/1984 | Eichlseder et al. | 425/562 X |
| 4,530,605 | 7/1985 | Eichlseder et al. | 264/328.1 X |

FOREIGN PATENT DOCUMENTS

| 247291 | 11/1947 | Fed. Rep. of Germany . |
| 900997 | 1/1954 | Fed. Rep. of Germany . |
| 1185809 | 1/1965 | Fed. Rep. of Germany . |
| 1270271 | 6/1968 | Fed. Rep. of Germany . |

OTHER PUBLICATIONS

Hashimoto et al., "Unique Thermoset Injection Molding System for Auto Body Panels", Society of Automotive Engineers, Inc., Feb. 1987.

Primary Examiner—Richard L. Chiesa
Attorney, Agent, or Firm—Finnegan, Henderson, Farabow, Garrett & Dunner

[57] ABSTRACT

An injection apparatus of a plunger type for injecting reinforced materials such as BMC is of a single barrel type or a double barrel type comprising a rotatable plunger disposed in the barrel. A check valve means for preventing a back flow of the materials in a metering process is provided such that it is closed when the plunger is actuated to move axially for injection.

6 Claims, 7 Drawing Sheets

INJECTION APPARATUS

BACKGROUND OF THE INVENTION

1. Field of the Invention

The present invention relates to an injection apparatus, particularly an injection apparatus preferably used for injecting reinforced plastics or bulk molding compounds (BMC) such as thermosetting resins including glass fibers.

2. Description of the Related Art

BMC, such as unsaturated polyester resin containing glass fibers, have been provided having various compositions and properties as needed for specific usages and molding processes. In molded products of BMC, the mechanical properties have a correlationship with the states of the fibers in the products, and the mechanical strength of the products is enhanced as the fibers are longer and are not bent. The fiber length in the product is related to not only the starting glass fibers but also to a molding process per se. In this regard, it is desired to adopt a molding process which causes the least possible damage to the glass fibers therein, in order to improve the mechanical properties of the product.

A plunger type molding apparatus does less damage to the glass fibers, and less bending of the fibers occurs, compared with a screw type molding apparatus. However, the use of such plunger type molding apparatuses has decreased, in spite of the above advantages. This is because the construction of the plunger type molding apparatus is disadvantageous, as explained hereinbelow with reference to FIG. 2 and FIG. 3 attached hereto.

Referring to FIG. 2 showing a conventional plunger type injection apparatus, the apparatus 1 comprises a stuffer or feeder 3 and a barrel 4 connected thereto by an elbow conduit 2. The stuffer 3 is provided with a feed cylinder 5 having a piston which forms a plunger 6 disposed in the stuffer 3 for reciprocating movement. An injection cylinder 7 is provided with a piston forming an injection plunger 8 slidably disposed in the barrel 4. The barrel 4 has an injection nozzle or orifice 10 formed at the free end thereof and a feed inlet 9 for admitting material from the stuffer 3 opening at an intermediate portion thereof in a position relatively close to the nozzle 10. A ball 11 is provided to form, in combination with the feed inlet 9, a check valve for preventing a back flow of the material. With the above arrangement, materials 12 are charged from the stuffer 3, and the plunger 6 is forced to move forward by the feed cylinder 5. The materials 12 are forced to pass through the elbow 2 and enter the barrel 4 through the feed inlet 9. While the supplied materials in the barrel are prevented from flowing back to the stuffer 3 by the check valve having the ball 11, the injection cylinder 7 is actuated to force the injection plunger 8 to move forward, to thereby inject the materials into a mold (not shown).

FIG. 3 shows another conventional plunger type apparatus in which the same numerals denote the same members or elements as those of the apparatus in FIG. 2. The apparatus shown in FIG. 3 has some differences from the first apparatus as shown in FIG. 2, in that the corresponding feed inlet 9A opens to the barrel 4A at the other end thereof far from the nozzle 10, and a check valve is not provided.

According to the apparatus shown in FIG. 2, it is noted that the feed inlet 9 is located close to the nozzle 10, with the result that stable metering of the materials 12 is easily effected since the materials can be supplied into the barrel 4 in a metering process, while being subjected to a back pressure exerted by the injection cylinder 7. In turn there is a disadvantage in that the materials 12 are likely to remain or stay in the barrel 4, since a leading part of the materials is likely to advance toward the injection plunger 8 and a following part of the materials is forced to move toward the nozzle 10, with the result that the subsequent materials are injected before all of the preceding materials are injected. Further, a sealing of the plunger 8 is likely to be damaged since the sealing must pass over the feed inlet in the injection process.

The apparatus as shown in FIG. 3 has certain disadvantages in that metering of the materials 12 is unstable, and the involvement or entrainment of air in the materials is likely to occur. This is because, with the feed inlet 9A provided at the side of the injection plunger 8, each shot is carried out at each retirement of the injection plunger 8, with the result that a leading part of the materials entered in advance must be ejected from the nozzle 10 before the following part of the materials, but the injection cylinder is not allowed to exert a back pressure against the materials in the barrel.

SUMMARY OF THE INVENTION

An object of the present invention is to overcome the above mentioned disadvantages of conventional plunger type injection apparatuses for use in producing molded products of reinforced materials such as BMC.

According to the present invention, there is provided a first kind of an injection apparatus of a plunger type for injecting reinforced materials such as BMC. The first apparatus comprises: a single cylindrical barrel having an injection nozzle at a free front end thereof; a plunger disposed in the barrel for axial reciprocating movement and rotation; a stuffer of a jack for feeding the materials, the stuffer communicating with the barrel through a feed outlet thereof; check valve means for preventing a back flow of the materials; a piston-cylinder arrangement for axially actuating the plunger; and a motor means for rotating said plunger, a metering or volume chamber having variable volume for the materials being defined by the inner surface of the barrel, the free front end thereof, the check valve means and the plunger. The materials are forced to enter from the jack stuffer into the barrel, and the plunger is forced to rotate with the entered materials having freedom to axially move rearward against a back pressure applied. The entered materials pass through the check valve means and enlarge the metering chamber. While the check valve means is forced to close to prevent a back flow of the metered materials from the metering chamber, the plunger is forced to axially move forward to thereby inject the metered material out of the nozzle.

In the above apparatus, preferably the plunger may have a constricted local part at a front portion thereof and the check valve means may comprise the constricted plunger part forming a valve chamber and a ring forming a movable valve member slidably and rotatably fitting the inner surface of said barrel and encircling the constricted plunger part with a space gap. The check valve means is forced to close when the plunger is forced to axially move forward for the injection.

Alternatively, a rear end portion of the plunger may be enlarged so as to slidably and rotatably fit the inner surface of the barrel, and a valve chamber receiving a ball forming a movable valve member therein is mounted between the barrel and the stuffer to communicate therebetween. The valve chamber has axial openings for the communication at its barrel side and stuffer side walls and grooves formed at its barrel side inner wall and communicating with the barrel side opening. The check valve means is closed when the ball covers the stuffer side opening, but is kept open when the ball covers the barrel side opening. The ball valve member is forced to move toward the stuffer side opening when the metered materials are injected, to thereby close the check valve means.

Further, the jack stuffer may have an axially cylindrical portion communicating with the feed outlet. The barrel is an axial extension rotatably and slidably disposed in the cylindrical stuffer portion with a sealing provided between the barrel and the stuffer. A second motor means is provided for rotating the barrel. The check valve means comprises the cylindrical stuffer portion forming a valve chamber and a local portion of the barrel having a feed inlet opening and covered by the cylindrical stuffer portion. The local barrel portion forms a movable valve member. The second motor means is activated to rotate the barrel over a certain angle to thereby close the check valve means.

With the above alternative apparatus, the plunger may have an enlarged rear portion slidably and rotatably fitting the inner surface of the barrel and a local portion adjacent the enlarged end portion, and the local plunger portion has a helically encircling projection.

According to the present invention, there is provided a second kind of an injection apparatus of a plunger type for injecting reinforced materials such as BMC. The second apparatus comprises: a double barrel arrangement comprising an outer cylindrical barrel having an injection nozzle at a free front end thereof and an inner cylindrical barrel slidably disposed in and fitting the inner surface of the outer barrel; a stuffer of a jack for feeding the materials, the inner barrel communicating with the interior of the outer barrel at the free front end thereof and with a feed outlet of the jack stuffer at the other rear end portion thereof; a plunger disposed in the double barrel arrangement for axial reciprocating movement and rotation; check valve means for preventing a back flow of the materials; a piston-cylinder arrangement for actuating the movable inner barrel relative to the outer barrel; a jack for activating the plunger relative to the inner barrel; a motor means for rotating the plunger. The plunger and the inner barrel in combination are activated by cooperation of the piston-cylinder arrangement and the jack to axially move forward. A metering or volume chamber having a variable volume for the materials is defined by the inner surface of the outer barrel, the free front end thereof, the check valve means and the inner barrel. The materials are forced to enter from the jack stuffer into the inner barrel, and the plunger is forced to rotate with the entered materials having freedom to axially move rearward against a back pressure applied together with the inner barrel. The entered materials pass through the check valve means and enlarge the metering chamber. While the check valve means is forced to close to prevent a back flow of the metered material from the metering chamber, the plunger and the inner barrel in combination are forced to axially move forward to thereby inject the metered materials out of the nozzle.

With above second apparatus, preferably the plunger may have an enlarged head portion extending out of the free front end of the inner barrel. The check valve means comprises the front inner barrel end forming a valve seat and the enlarged plunger head forming a movable valve member for seating at the valve seat. The jack for the plunger activates the valve member to close the check valve means.

Alternatively, the inner barrel may have a constricted hollow head. The plunger has a tapered head located in the interior of the inner barrel. The check valve means comprises the constricted inner barrel head forming a valve seat and the tapered plunger head forming a movable valve member for seating at the valve seat. The jack for the plunger activates the valve member to close the check valve means.

Further, the inner barrel may have a hollow head portion forming a valve chamber therein, where a ball forming a movable valve member is received. The valve chamber has axial openings at its front and rear walls and grooves formed at its front inner wall and grooves formed at the front inner wall and communicating with the front opening. The check valve means is closed when the ball covers the rear opening but kept open when the ball covers the front opening. The ball valve member is forced to move rearward relative to said inner barrel when the metered materials are injected, thereby closing the check valve means.

Still further, the inner barrel may have a hollow head portion forming a valve chamber therein and a valve member pivotable about an axis perpendicular to that of the inner barrel. In this case, driving means is provided to actuate the pivotable valve member.

DETAILED DESCRIPTION OF THE PREFERRED EMBODIMENTS

Figure 1:
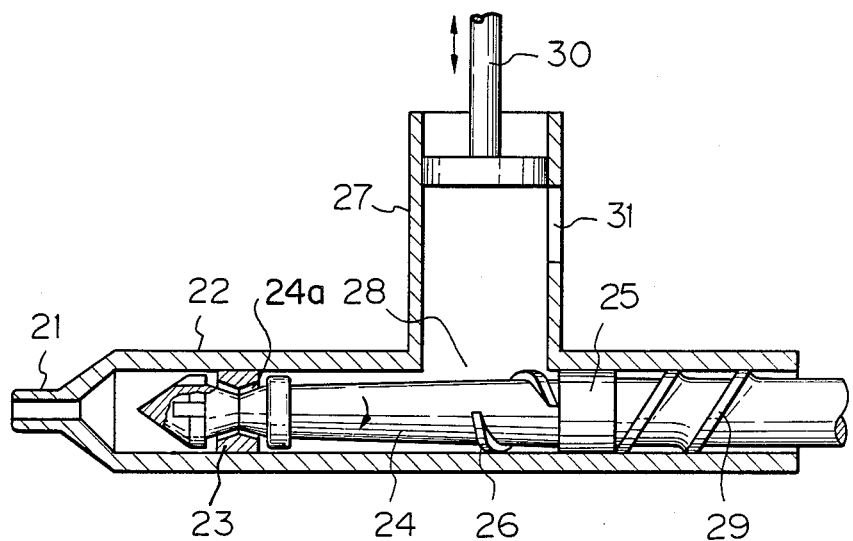
FIG. 1 is a schematic axially sectional view of a plunger type injection apparatus according to the present invention, the apparatus being a single barrel type.
Figure 2:
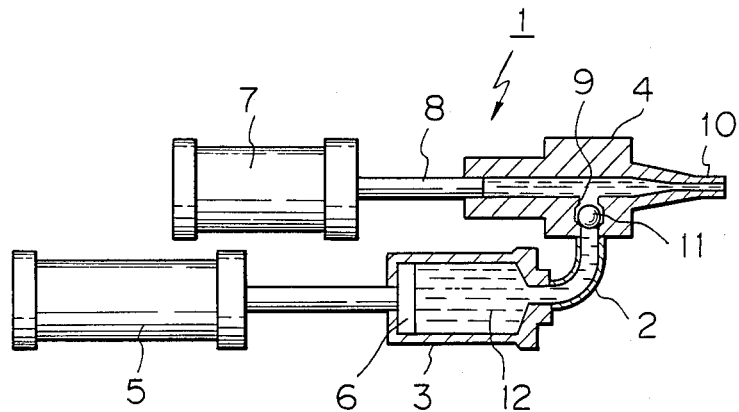
FIG. 2 is a schematic axially sectional view of a prior art plunger type injection apparatus for reinforced materials.
Figure 3:
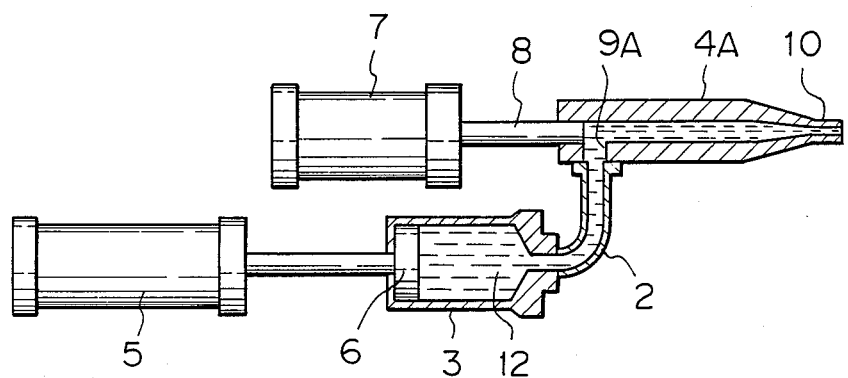
FIG. 3 is a similar view of another, similar-type prior art apparatus.

Referring to FIG. 1 showing a first embodiment of the present invention, a plunger type injection apparatus comprises a single barrel 22 having a cylindrical extension. The barrel 22 has a circumferential heater (not shown) imparting a relatively low heat to the barrel 22 and a nozzle 21 at a free front end of the barrel, mounted for a mold (not shown). A plunger 24 is mounted in the barrel 22 with a space gap for axial reciprocation and for rotation. The plunger 24 is provided with a check ring 23 slidably and rotatably fitted in the inner surface of the barrel 22 and encircling a constricted part of the plunger 24 formed at a free front end portion thereof. A head of the plunger 24 adjacent to the constricted part has grooves 24a at its circumferential surface, which allow the feed materials to pass over the plunger head, even if the ring 23 is in contact with the plunger head. The plunger 24 and the ring 23, in combination, form a check valve which prevents a back flow of reinforced materials to be injected through the barrel 22 and nozzle 21 into the mold. The plunger 24 is further provided with a conventional piston-cylinder device (not shown) and a hydrodynamic motor (not shown) for axial and rotational movement thereof.

The plunger 24 has an enlarged part 25 at an intermediate portion thereof, slidably and rotationally fitted in the inner surface of the barrel 22. A space gap between the plunger 24 and the barrel 22 allows the materials to move axially along the plunger 24 toward the nozzle 21. A single pitch screw thread 26 is formed to project from the surface of the plunger 24 in the vicinity of the enlarged part 25 at a front side thereof. The screw thread 26 is designed so that it forces the materials which were fed from the stuffer described below, to move forward upon normal rotation of the plunger 24. Accordingly, the reinforced materials are prevented from staying in the same place within the plunger 24 and by-passing along the barrel 22, whereby a unification or homogenity of the reinforced materials including glass fibers is attained. In this regard, the screw 26 is designed to be located at a feed outlet of the stuffer.

Another screw thread 29 is formed at the rear of the plunger enlarged part 25 in order to smoothly discharge out of the barrel a part of the materials, which materials may have leaked through the space gap at the front of the enlarged part 25 into the rear of the enlarged part 25 through a clearance between the enlarged part 25 and the barrel 22. In this regard, the rear screw 29 is designed to have an angle which is the reverse of that of the front screw thread 26.

Numeral 27 denotes the above mentioned stuffer, which comprises a jack having a vertical axis perpendicular to that of the barrel 22. The stuffer jack 27 is mounted on th barrel 24 and comprises a piston or plunger 30 and a cylinder 31 having feed outlet 28 at a lower end and thereof communicating with the barrel 22 at a feed inlet thereof.

With the apparatus as shown in FIG. 1, the plunger 24 is first positioned at a forward limit of movement and is rotated at 25 to 150 r.p.m. Reinforced materials such as BMC are charged in the stuffer 27, and extruded downward by the stuffer plunger 30. BMC is fed into the barrel 22 and is forced to move forward in the space gap between the barrel 22 and the plunger 24. The fed materials are forced to pass through the check valve involving the ring 23, and are stored in a metering or volume chamber formed in the barrel 22 between the nozzle 21 and the head of the plunger 24. In this feeding or metering process, the plunger is free to move rearwardly under a back pressure applied, and as the metering chamber is increasingly filled with BMC, the plunger is correspondingly moved rearwardly by the back pressure generated thereby. When BMC are used as the materials, the temperature of the materials may be set to 40° to 60° C., and the temperature of the mold may be set to 160° C. The extruding pressure applied to the materials in the stuffer 27 may be in an order of 1 kg/cm$^2$ to 140 kg/cm$^3$. The back pressure may be exerted by controlling the hydraulic pressure of oil in a rear chamber of the piston-cylinder device. Alternatively, such a back pressure may be exerted due to friction occurring between the enlarged part 25 and the barrel 22.

In the above arrangement, rotation of the plunger 24 causes the materials to be uniformalized or homogenized and prevents the materials from taking a by-pass flowpath. The rotating screw thread 26 and the extruding stuffer plunger 30 cooperate to cause the materials to be transferred smoothly in the barrel 22 without remaining in localized spots. When the volume chamber is increasingly filled with a predetermined amount of the materials, the rotation of the plunger 24 is stopped, and the piston-cylinder device is then activated to cause the plunger 24 to move forward and thereby inject the metered materials into the mold through the nozzle 21. The check valve is opened during the feeding and metering process, and is closed during the injection process.

Figure 4:
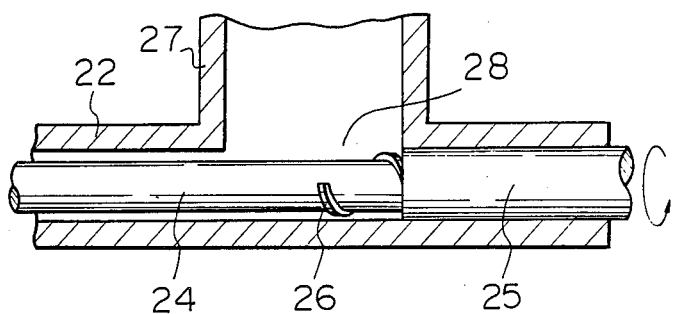
FIG. 4, FIG. 5, and FIG. 6 are schematic axially sectional views of a modified apparatus of FIG. 1 partially showing the modifications thereof, respectively.
Figure 5:
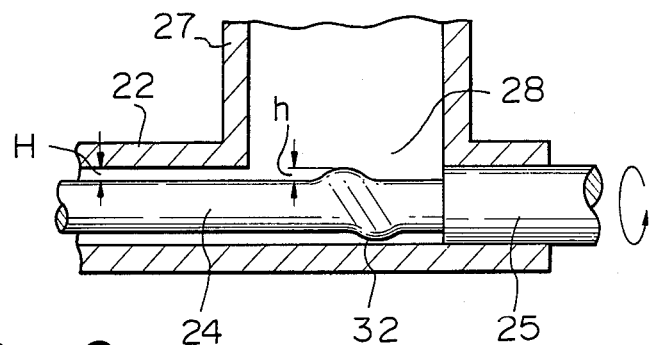
Figure 6:
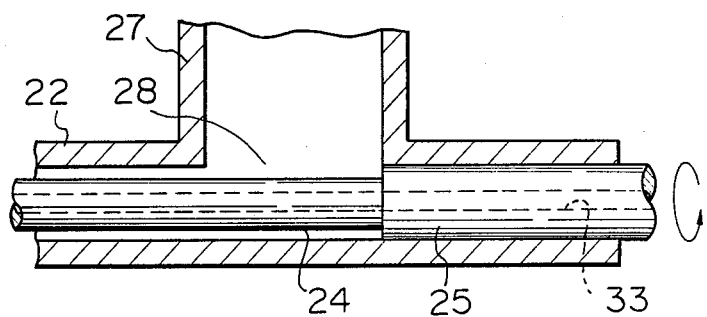

Modifications of the apparatus shown in FIG. 1 are indicated in FIGS. 4 to 6. Referring to FIG. 4, the modification resides in that an enlarged part 25 corresponds to that of FIG. 1, but extends right to the rear end of the plunger 24 so that it forms a rear portion per se of the plunger 24. As a result, a second screw such as the screw 29 of FIG. 1 is omitted, and accordingly, the construction of the plunger become simpler than that of FIG. 1.

Referring to FIG. 5, a modification is made to the apparatus of FIG. 4, and resides in that a helical projection 32 is formed in place of the screw thread 26 at the surface of the plunger 24. The screw thread 26 of FIG. 4 has relatively keen edges and thus these edges are likely to damage reinforced materials in comparison, if the materials contain glass fibers. Conversely, the helical projection 32 has no edge, but instead, has a relatively round profile. Such a profile will not damage the glass fibers. Preferably, a ratio of a height h of the projection to the space gap H between the front portion of the plunger 24 and the barrel 22 is not more than 0.95 (h/H). A plurality of such helical projections may be formed on the plunger 24.

Referring to FIG. 6, the modification made is different to those of FIG. 4 and FIG. 5 in that both any of the screw thread 26 and the projection 32 are omitted and, instead, an axial channel 33 is formed in the plunger 24 for cooling the materials around the plunger with water supplied therein. This cooling means may prevent super-heating of local parts of the materials and also allow friction, occurring between the materials and the barrel and between the materials and the plunger, to be controlled, to thereby improve performance of the material feed. An admixing effect due to the plunger as shown in FIG. 6 for the materials in the barrel 24 is reduced in comparison with those of the plungers 24 as shown in FIGS. 4 and 5. However, the admixing effect is obtained to some extent due to cooperation of the rotation of the plunger 24 and the extruding pressure exerted by the stuffer plunger 30. The modification as shown in FIG. 6 is also advantageous in that omission of the screw thread 26 or the projection 32 simplifies working of the surface of the plunger 24.

Figure 7:
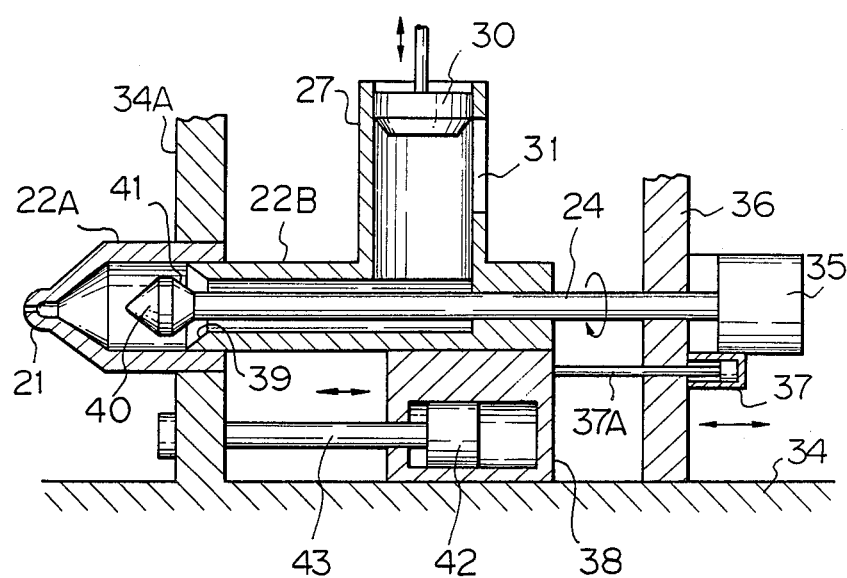
FIG. 7 is a view corresponding to FIG. 1, showing another injection apparatus of plunger type according to the present invention, the apparatus being a double barrel type.

Referring to FIG. 7, showing a second embodiment of the present invention, a plunger type injection apparatus is a double barrel type having an outer stationary barrel 22A and an inner movable barrel 22B slidably disposed in and fitting the outer barrel 22A. The stationary outer barrel 22A has a nozzle 21 at the free front end and is fixed to a stationary support 34A, which is integral with a base 34 of the apparatus. The apparatus base is movable relative to the mold so that the nozzle 21 can be placed in contact with the mold as needed. A plunger 24 is mounted in the double type barrel for axial reciprocation and rotation with a space gap between the plunger 24 and the inner barrel 22B. A hydrodynamic motor 35 for rotating the plunger 24 is fixed at the rear end thereof to a movable support 36, which is designed so as to be slidable along and on the apparatus base 34. The movable support 36 is provided with a jack 37 having a piston rod 37A, which is connected to a movable base 38 of the inner barrel 22B. The movable base 38 is slidable along the apparatus base 34. The jack 37 is actuated to move the plunger 24 forward or rearward relative to the inner barrel 22B. The same stuffer 27 as that of FIG. 1 is provided and communicates with the inner barrel 22B.

The inner barrel 22B has a conical opening 39 at the free front end thereof, forming a valve seat, and the plunger 24 has an enlarged head 40, forming a movable valve member to be engaged at a tapered rear part 41 thereof with a valve seat. The plunger head 40 and the conical barrel opening 39 form a check valve. A rearward movement of the plunger 24 relative to the inner barrel 22B upon actuation of the jack 37 causes the valve to be closed, to thereby prevent a back flow of the materials. When the plunger 24 moves relative to the inner barrel 22B, the check valve is opened. The slidable base 38 forms a piston-cylinder device 42 having a piston rod 43 connected to the stationary base 34. The device 42 is actuated so that the inner barrel 22B moves axially forward or rearward relative to the outer barrel 22A. While the valve is opened as shown in FIG. 7, the stuffer jack 27 is actuated to make a plunger 30 extrude the materials from the stuffer into the inner barrel 22B and concurrently the motor is actuated to rotate the plunger 24. This is a feeding and metering operation of the apparatus, in which the fed materials pass through the opened valve and are stored in a metering chamber formed between the nozzle 21 and the plunger head 40 in the outer barrel 22A. As the volume of the metering chamber increases, the plunger and the inner barrel 22B, combined by means of the jack 37, move rearward relative to the outer barrel 22A against a back pressure applied thereto. When a predetermined amount of the materials is metered, the operation of the stuffer 27 is stopped and the jack 37 is actuated to make the plunger 24 move rearward relative to the inner barrel 22B so that the valve is closed. While the valve is closed, only the piston-cylinder device 42 is actuated, to make the inner barrel 22B, in combination with the plunger 24, move forward and thereby inject the metered materials into the mold through the nozzle 21.

In the second embodiment of the apparatus as above, the plunger 24 may be modified so as to have an enlarged part and a screw thread such as the screw thread (25 and 29) of FIG. 1. Further only an enlarged part such as that (25) of FIG. 4 may be integrated with the plunger 24.

Figure 8:
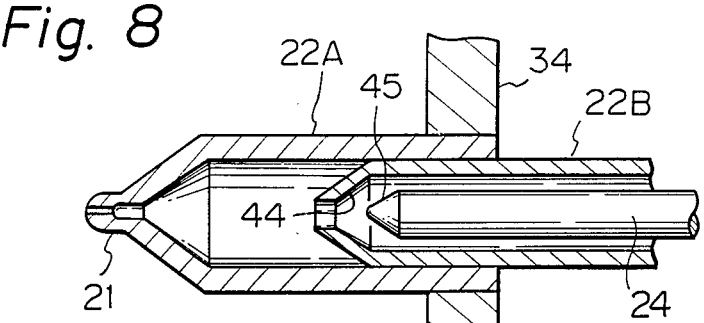
FIG. 8, FIG. 9, and FIG. 10 are views corresponding to FIGS. 4 to 6, showing modifications of the double barrel type apparatus of FIG. 7, respectively.
Figure 9:
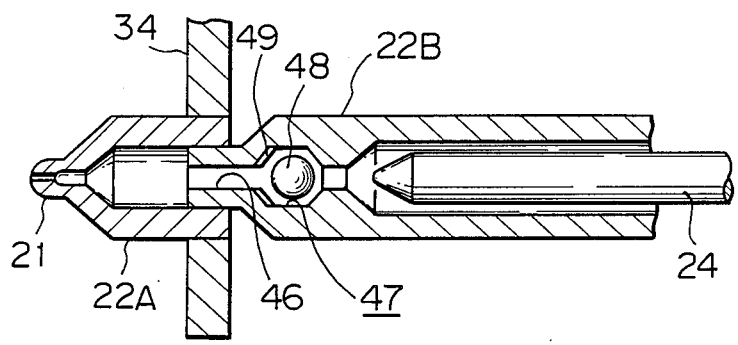
Figure 10:
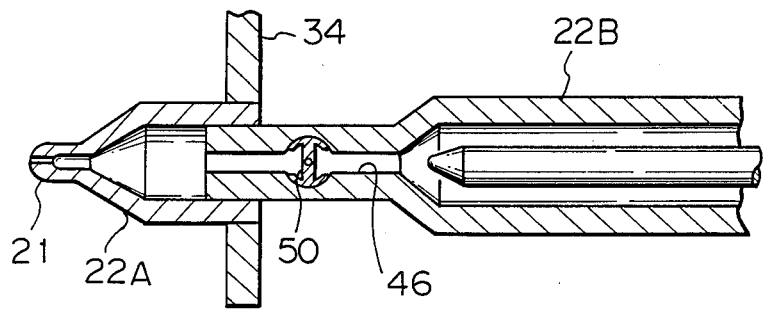

FIG. 8, FIG. 9 and FIG. 10 show modified check valve means incorporated with the double barrel type apparatus as shown in FIG. 7.

Referring to FIG. 8, the modification resides in that the front open end of the inner barrel 22B has a conical shape having a central hole integral with the hollow of the barrel 22B. The tapered open end has a conical inner surface 44. The plunger 24 has a tapered head having an inclined surface. The tapered plunger head is located in the inner barrel 22B and forms a movable valve member, while the conical open end of the inner barrel 22B forms a valve seat. The valve comprised of the valve seat and the valve chamber is closed when the plunger 24 is moved forward relative to the inner barrel 22B thereby engaging the plunger head 24 with the conical end of the inner barrel 22B.

Referring to FIG. 9, the modified check valve comprises a valve chamber formed in the front end of the inner barrel 22B, which is open to the outer barrel 22A through a narrow passage 46 and also to the interior of the inner barrel 22B through a constricted passage. A check ball 48 is movably received in the valve chamber to form a movable valve member. The valve chamber has a front inner surface having grooves 49 formed therein to communicate with the narrow passage 46. While the ball 48 is in contact with the front inner surface of the valve chamber, the valve is open to allow the materials to enter through the grooves 49 and the narrow passage into the metering chamber located in front of the inner barrel 22B. When the inner barrel 22B is actuated to inject the metered materials into the mold, the ball 48 is forced by the metered materials to move rearward to the rear surface of the valve chamber to thereby close the valve.

Referring to FIG. 10, the inner barrel 22B has a front end portion forming a valve chamber having a through-hole passage 46. A conventional movable valve member 50 is pivotally mounted in the valve chamber. An actuator (not shown) is provided to drive the valve member 50 to thereby close the valve.

Figure 11:
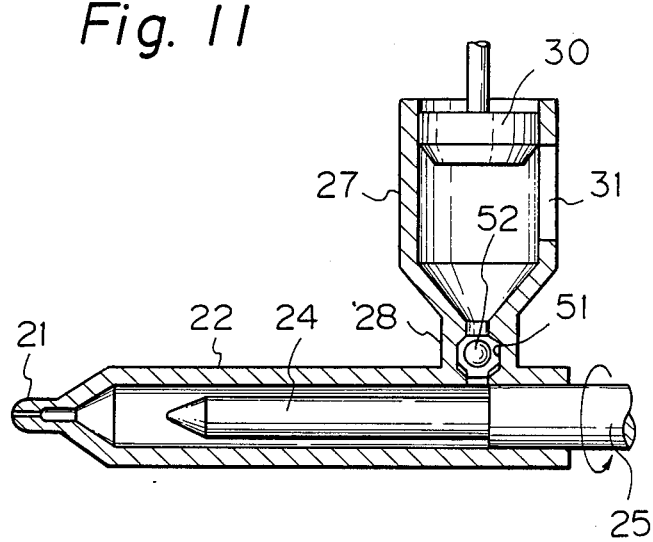
FIG. 11 and FIG. 12 are views corresponding to FIG. 1 showing other modified single barrel type apparatuses of according to the present invention, respectively; and, FIG. 13 and FIG. 14 are cross-sectional views of the apparatus shown in FIG. 12 taken along the line XIII—XIII thereof, showing axial operations of a check valve provided in the apparatus, respectively.
Figure 12:
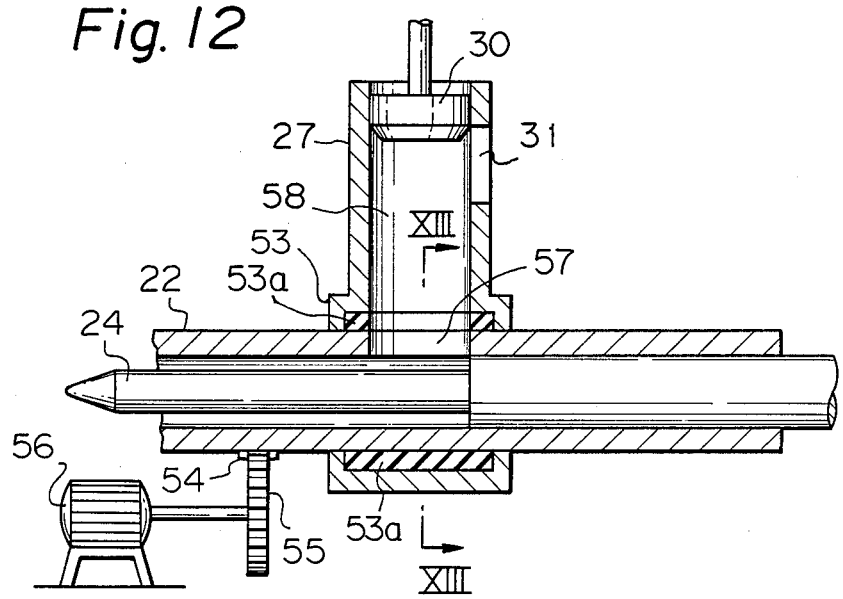

FIG. 11 and FIG. 12 show other embodiments of the present invention. Both of these embodiments relate to a single barrel type injection apparatus as shown in FIG. 1, with a check valve means modified from that of FIG. 1.

Referring to FIG. 11, a jack stuffer 27 is provided to be incorporated with a valve chamber in substantially the same manner as that of FIG. 9. The valve means comprises a valve chamber 28 and a movable ball valve member 51 received therein, and is located between a feed inlet open to a rear portion of the barrel 22 and the feed outlet of the stuffer 27 to communicate with the barrel and the stuffer. The plunger 24 has an enlarged rear portion slidably and rotatably fitted in the inner surface of the barrel, and a front portion located in the barrel 22 with a space gap therebetween. A metering chamber is defined by the interior of the barrel 22 and the front portion of the plunger 24. When the stuffer 27 feeds the materials, the ball 52 is in contact with the barrel side inner surface of the valve chamber, and this contact keeps the valve open. When the materials in the metering chamber are injected into the mold by the action of the plunger 24, the ball 52 is forced into contact with the stuffer side inner surface of the valve chamber by a pressure exerted by the metered materials, until the enlarged rear portion of the plunger 24 covers the feed inlet of the barrel 22, to thereby close the valve.

Figure 13:
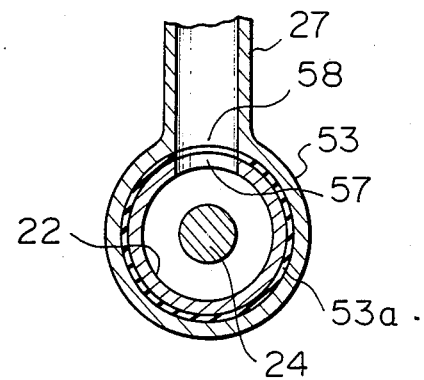
Figure 14:
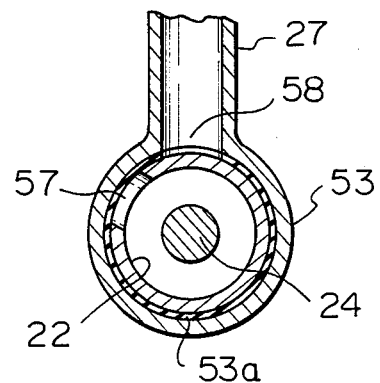

Referring to FIG. 12, a vertical jack stuffer 27 is provided to have an additional cylindrical portion 53 coaxial with the barrel 22, at the point where the barrel 22 is rotatably and slidably disposed. The cylindrical portion 53 communicates with a feed outlet 58 of the stuffer 27. A rotatable barrel 22 is provided having a feed inlet opening 57 covered by the additional stuffer portion 53. A sealing 53a is provided between the barrel 22 and the additional stuffer portion 53 to prevent the feed materials from leaking out of the stuffer 27. The feed inlet opening 57 is designed so as to communicate with the feed outlet 58 of the stuffer 2 when the rotatable barrel 22 is positioned at a specific angle, as shown in FIG. 13, and to be covered by the wall of the additional stuffer portion 53 when the rotatable barrel 22 is positioned at another angle, for example, 45° from the above specific angle, as shown in FIG. 14.

A motor 56 is provided to rotate the barrel 22 by means of a transmission including a rack 54 and a pinion 55. While the materials are fed into the barrel 22, the check valve is opened by keeping the barrel at the specific angle. When the injection is carried out, the valve is closed by setting the barrel 22 to the other angle.

With the double barrel type apparatus as shown in FIGS. 7 to 10, a check valve means as that of FIG. 11 or FIG. 12 may be alternatively employed in place of the valve means provided in this apparatus.

Further, with the apparatus as shown in FIGS. 7 to 12, the plunger 24 may have a screw thread such as the before mentioned screw thread 26 or a projection such as the before mentioned projection 32.

With respect to the apparatus involving the screw thread 26, the plunger 24 with the screw thread 26 formed thereon is supported only at its rear end. In this regard, the plunger 24 is subjected to a biased weight due to the action of the feed materials forced in by the jack stuffer 27, with the result that the plunger supporting portion involved is liable to wear or seizure. To prevent such an unfavorable phenomenon, it is preferable to adopt the following feeding and metering operation. First, the plunger 24 is rotated so that the feed materials fill a local circumferential space around the plunger 24 in the vicinity of the feed outlet of the stuffer 27. Then, while the rotation continues, the jack stuffer 27 is actuated to extrude the materials into the barrel 22.

Further, to prevent a terminating portion of the plunger 24 (or the plunger with the inner barrel 22B) from being deviated from a predetermined position in the metering process, the following countermeasures may be adopted.

1. About 5 to 50 mm before a predetermined metering stroke of the plunger is attained, a pressure exerted by the jack stuffer is reduced to zero, in the alternative ways described below in items 2 to 4.

2. In the process of item 1 above, the stuffer pressure is reduced in a step manner.

3. In the process of item 1 above, a feed speed is fed back as information for reducing the pressure in a step manner.

4. In the process of item 1 above, a time when the metering terminates is predicted from a metering speed, and the stuffer pressure is reduced in a step manner with each step being carried out in advance at a predetermined period of time calculated from the predicted time data.

5. In place of the above presure reducing process, the r.p.m. of the plunger is reduced rapidly or in a step manner. This process may be carried out concurrently with the pressure reducing process.

6. When the metering terminates or just before the termination, the jack plunger of the stuffer is stopped and is then moved back.

7. When the metering terminates or just before the termination, the plunger is subjected to an increased back pressure so that the plunger is prevented from moving back from the metering position.

8. A pressure applied to the jack plunger of the stuffer is controlled according to the volume of mate rials in the stuffer, to adjust the density of the material to a predetermined level. That is, when the volume of the materials is large, the pressure is increased, and when the volume of the materials is decreased, the pressure is reduced accordingly.

The advantageous feature of the apparatus of the present invention resides in that the metering and feeding process does not damage the fibers contained in the reinforced materials, i.e., the fibers in the materials are not cut or bent. Further the materials are assuredly injected in the feeding order without substantial interchange among the leading feed material parts and subsequent or following feed material parts in the barrel. Under these circumstances, very little of the materials remains, and a back flow of the materials is prevented. In this connection, the amount of a shot is always stable. Further, the metering becomes considerably stable due to appropriate controls of the r.p.m. of the plunger, a pressure exerted by the jack plunger of the stuffer against the materials and a back pressure applied against the feed materials, and air entrainment with the materials is reduced.

During experiments with the apparatus of the present invention, there was a case where BMC was fed into the barrel 22 due to action of the jack stuffer 27 without cooperation of the plunger due to a rotation thereof. In this case, most of the materials fed were forced to remain at local positions in the barrel, with the result that the materials were not moved smoothly forward, and thus the metering process was extremely degraded. In this case, an increased extrusion pressure of the jack stuffer 27 did not improve the metering performance.

However, in cases where the plunger 24 was rotated at a relatively low speed, such as 25 to 150 r.p.m., while BMC was fed by the action of the jack stuffer 27, BMC was smoothly transferred forward through the barrel and the metering was smoothly and assuredly performed.

A comparison of impact strength was made between molded products injected by the plunger type apparatus according to the present invention and those injected by a conventional screw plunger type injection apparatus. The result was that the products according to the present invention had an impact strength of 13 kg-cm/cm$^2$, while the products of the prior art had an impact strength of 8 kg-cm/cm$^2$.

Where different reinforced materials were used in the above two kinds of apparatus, the resultant products of the present invention had an impact strength of 18 kg-cm/cm$^2$, while the products of the prior art had an impact strength of 11 kg-cm/cm$^2$.

We claim:

1. An injection molding apparatus for injecting a thermosetting resin having glass fibers into a mold, comprising:
    a cylindrical barrel having a central axis and a tapered first end forming an injection nozzle;

supply means for injecting a predetermined flow of the thermosetting resin into said cylindrical barrel, said supply means including an outlet port extending axially along said barrel;

plunger means disposed within said barrel for channeling the thermosetting resin toward said injection nozzle and for injecting the thermosetting resin through said injection nozzle, said plunger means including an elongated plunger and motor means connected to said plunger at a second end of said barrel for selectively rotating and reciprocating said plunger about the axis of said barrel, said plunger means including a plunger head at an end of said plunger facing said injection nozzle, groove means along the periphery of said plunger substantially adjacent said plunger head, and a check ring slidably and rotatably confined within said barrel along said groove means to admit the thermosetting resin into an expandable metering chamber extending between said injection nozzle and said plunger head, said check ring also preventing a backflow of the thermosetting resin from said metering chamber, said plunger having a peripheral portion between said groove means and said outlet port of said supply means sized to have a cross section narrower than the diameter of said cylindrical barrel, said peripheral portion and said barrel defining a continuous annular gap between said groove means and said outlet port to channel the thermosetting resin containing the glass fibers into said metering chamber; and means for generating back pressure within said barrel to urge said plunger toward said second end further filling said metering chamber with the thermosetting resin, the metered resin being injected through axial movement of said plunger in the direction of said injection nozzle.

2. An injection molding apparatus for injecting a thermosetting resin having glass fibers into a mold, comprising:

a cylindrical barrel having a central axis and a tapered first end forming an injection nozzle;

supply means for injecting a predetermined flow of the thermosetting resin into said cylindrical barrel, said supply means including an outlet port extending axially along said barrel;

plunger means disposed within said barrel for channeling the thermosetting resin toward said injection nozzle and for injecting the thermosetting resin through said injection nozzle, said plunger means including an elongated plunger and motor means connected to said plunger at a second end of said barrel for rotating and reciprocating said plunger about the axis of said barrel, said plunger including a first helical extension extending radially and axially around a peripheral portion of said plunger at a first angle, said helical extension being axially aligned with said outlet port of said supply means to rotate and reciprocate proximate said outlet port directing the resin admitted through said outlet port toward said first end, said plunger means also including a plunger head at an end of said plunger facing said injection nozzle, groove means disposed along said plunger substantially adjacent said plunger head, and a check ring slidably and rotatably confined within said barrel along said groove means to admit the thermosetting resin into an expandable metering chamber extending between said injection nozzle and said plunger head, said check ring also preventing a backflow of the thermosetting resin from said metering chamber, said plunger having a peripheral portion between said groove means and said first helical extension sized to have a cross section narrower than the diameter of said cylindrical barrel, said peripheral portion and said barrel defining a continuous annular gap between said groove means and said outlet port to channel the thermosetting resin containing the glass fibers directed by said first helical extension into said metering chamber; and means for generating back pressure within said barrel to urge said plunger toward said second end further filling said metering chamber with the thermosetting resin, the metered resin being injected through axial movement of said plunger in the direction of said injection nozzle.

3. The injection molding apparatus according to claim 2, wherein said supply means includes a stuffer chamber extending from said outlet port, and wherein a plane extending through a center of said stuffer chamber is aligned substantially perpendicular to the axis of said barrel, said stuffer chamber having an inlet port and housing a reciprocating stuffer plunger to urge said predetermined flow of the thermosetting resin admitted through said inlet port toward said outlet port.

4. The injection molding apparatus according to claim 2, wherein said first helical extension extends not more than 360° around the periphery of said plunger.

5. The injection molding apparatus according to claim 2, wherein said means for generating back pressure includes an annular ring extending from said plunger and frictionally engaging said barrel between said outlet port and said second end.

6. The injection molding apparatus according to claim 5, wherein said plunger means also includes a second helical extension extending radially and axially around a peripheral portion of said plunger between said annular ring and said second end, said second helical extension disposed at a second angle to discharge any resin urged between said annular ring and said barrel at said second end.

* * * * *